(12) United States Patent
Kim et al.

(10) Patent No.: US 8,363,094 B2
(45) Date of Patent: Jan. 29, 2013

(54) ELECTRONIC DISPLAY DEVICE

(75) Inventors: Beom-Shik Kim, Yongin (KR); Hui Nam, Yongin (KR); Chan-Young Park, Yongin (KR); Ja-Seung Ku, Yongin (KR); Hyoung-Wook Jang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1062 days.

(21) Appl. No.: 12/255,978

(22) Filed: Oct. 22, 2008

(65) Prior Publication Data

US 2009/0102839 A1  Apr. 23, 2009

(30) Foreign Application Priority Data

Oct. 23, 2007  (KR) .................. 10-2007-106690

(51) Int. Cl.
*H04N 13/04* (2006.01)
(52) U.S. Cl. ................. 348/56; 348/54; 348/55
(58) Field of Classification Search ........... 348/51, 348/54–56; 349/15
See application file for complete search history.

(56) References Cited

U.S. PATENT DOCUMENTS

| | | | | |
|---|---|---|---|---|
| 6,137,456 A * | 10/2000 | Bhagavatula et al. | ........... | 345/7 |
| 6,459,532 B1 * | 10/2002 | Montgomery et al. | ....... | 359/462 |
| 6,970,290 B1 * | 11/2005 | Mashitani et al. | ........... | 359/462 |
| 7,825,999 B2 * | 11/2010 | Chestak et al. | ................. | 349/15 |
| 8,018,482 B2 * | 9/2011 | Kim et al. | ...................... | 348/42 |
| 8,125,581 B2 * | 2/2012 | Kim et al. | ...................... | 349/15 |
| 2007/0046777 A1 * | 3/2007 | Song et al. | ..................... | 348/56 |
| 2008/0024598 A1 * | 1/2008 | Perlin et al. | ................... | 348/55 |
| 2009/0102839 A1 * | 4/2009 | Kim et al. | ..................... | 345/419 |

FOREIGN PATENT DOCUMENTS

| | | |
|---|---|---|
| JP | 2006-189766 | 7/2006 |
| JP | 2007-171908 | 7/2007 |
| KR | 2007-43148 | 4/2007 |
| KR | 2007-48355 | 5/2007 |

* cited by examiner

*Primary Examiner* — Gregory Todd
(74) *Attorney, Agent, or Firm* — Lee & Morse, P.C.

(57) ABSTRACT

An electronic display device includes a display unit including a plurality of scan lines, a plurality of data lines, and a plurality of pixels, and a barrier unit covering the display unit, including a plurality of first areas and a plurality of second areas alternately arranged along a length direction of the data lines, a first electrode group respectively provided in each of the first areas, each of the electrode groups including a plurality of first sub-electrodes and a plurality of second sub-electrodes alternately arranged along a length direction of the scan lines, a second electrode group provided in each of the second areas on a layer that is different from a layer on which the first electrode group is provided, each of the second electrode groups including a plurality of third sub-electrodes and a plurality of fourth sub-electrodes alternately arranged along the length direction of the scan line, and an insulation layer between the first and second electrode groups.

19 Claims, 12 Drawing Sheets

FIG. 3A
First period (T1)
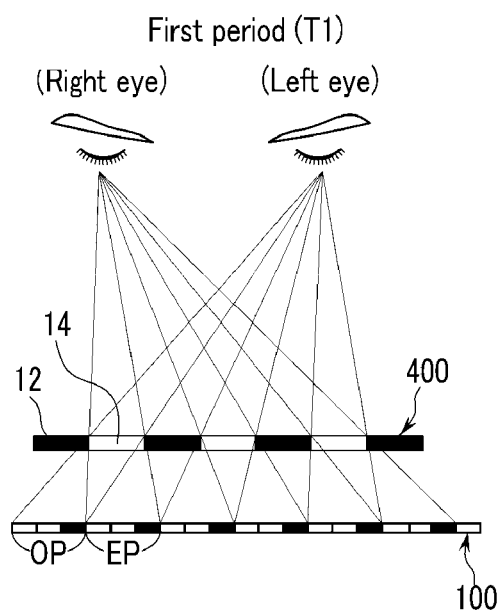
FIG. 3B
Second period (T2)
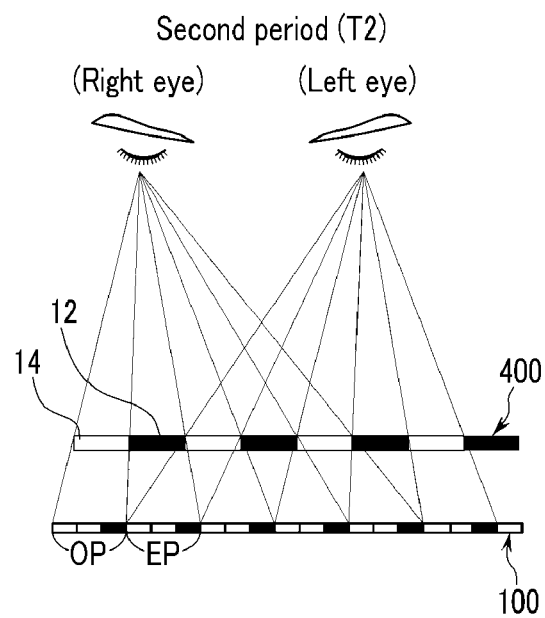
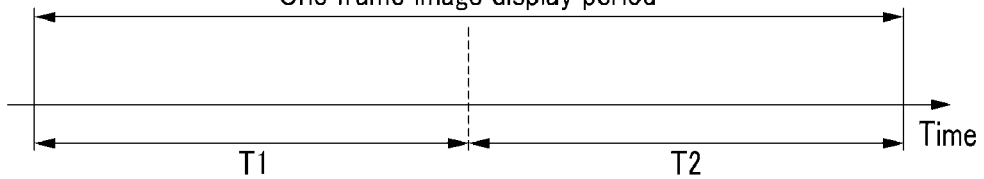

ELECTRONIC DISPLAY DEVICE

CROSS-REFERENCE TO RELATED APPLICATIONS

This application claims the benefit of Korean Patent Application No. 2007-106690, filed on Oct. 23, 2007, in the Korean Intellectual Property Office, the disclosure of which is incorporated herein by reference.

BACKGROUND OF THE INVENTION

1. Field of the Invention

Aspects of the present invention relate to an electronic display device and, more particularly, to an electronic display device capable of displaying a stereoscopic image.

2. Description of the Related Art

Generally, electronic display devices to display a stereoscopic image are configured to enable a user to stereoscopically perceive an image by providing different images to left and right eyes. Among the various types of electronic display devices used to display a stereoscopic image which have been developed, an autostereoscopic image device has been developed to enable a user to see a stereoscopic image by using binocular parallax without wearing equipment such as polarizing glasses.

A conventional autostereoscopic image device includes a display unit to separate pixels into left-eye pixels and right-eye pixels to display a left-eye image and a right-eye image, and a barrier unit provided in front of the display unit to separately provide the realized left-eye image and the realized right-eye image to left and right eyes, respectively. The barrier unit includes transparent electrodes and a liquid crystal layer to form a light transmitting portion and a light blocking portion.

The display unit divides one frame into two periods, displays an image combined in an order which moves from an image seen by the left-eye to an image seen by the right-eye in a horizontal direction of a screen during a first period, and displays an image combined in an order which moves from an image seen by the right-eye to an image seen by the left-eye during a second period. The barrier unit is synchronized with an operation of the display unit to change locations of the light transmitting portions during the first period and the second period, which is referred to as a "time-division driving method." Here, a stereoscopic image of a resolution that is the same as a resolution of a plane image may be realized.

However, display units which display an image by using a plurality of scan lines and a plurality of data lines, such as a liquid crystal display (LCD) and an organic light emitting diode (OLED) display, sequentially display an image of the first period and an image of the second period along a scan direction. That is, while an image of a first frame for the first period remains at the display unit, an image of a second frame for the second period is displayed at the display unit. Therefore, since the right-eye images and left-eye images may not be separated while the image of the first period and the image of the second period are displayed together on the display unit, crosstalk may occur.

To prevent the crosstalk, a system to display the image of the first period and the image of the second period in one frame more than twice has been suggested. However, when this system is used, a driving frequency increases, causing power consumption to problematically increase.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention have been developed in an effort to provide an electronic display device to suppress crosstalk, improve quality of a stereoscopic image, and reduce power consumption.

According to an embodiment of the present invention, an electronic display device includes a display unit including a plurality of scan lines, a plurality of data lines, and a plurality of pixels crossing the scan and data lines, and a barrier unit covering the display unit, including a plurality of first areas and a plurality of second areas alternately arranged along a length direction of the data lines. In addition, the barrier unit includes first electrode groups respectively provided in each of the first areas, each of the first electrode groups including a plurality of first sub-electrodes and a plurality of second sub-electrodes alternately arranged along a length direction of the scan lines, second electrode groups respectively provided in each of the second areas on a layer that is different from a layer on which the first electrode group is provided, each of the second electrode groups including a plurality of third sub-electrodes and a plurality of fourth sub-electrodes alternately arranged along the length direction of the scan line, and an insulation layer between the first and second electrode groups.

According to an aspect of the present invention, each of the first sub-electrodes neighbors a corresponding one of the third sub-electrodes without a gap therebetween, and each of the second sub-electrodes neighbors a corresponding one of the fourth sub-electrodes without a gap therebetween, along the length direction of the data lines.

According to an aspect of the present invention, each of the first sub-electrodes and the second sub-electrodes includes a first end and a second end along the length direction of the data lines, a first connection electrode is provided outside the first areas to face the first ends along the length direction of the scan lines, and first connecting portions are respectively formed between each of the first sub-electrodes and the first connection electrode to electrically connect each of the first sub-electrodes and the first connection electrode.

According to an aspect of the present invention, a second connection electrode is provided outside the first area to face the second ends along the length direction of the scan lines, and second connecting portions are respectively formed between each of the second sub-electrodes and the second connection electrode to electrically connect each of the second sub-electrodes and the second connection electrode.

According to an aspect of the present invention, one of the third sub-electrodes and a corresponding one of the fourth sub-electrodes overlap with at least one of the connection electrodes among the first and second connection electrodes.

According to an aspect of the present invention, the electronic display device further includes a third connection electrode electrically connected to each of the third sub-electrodes and a fourth connection electrode electrically connected to each of the fourth sub-electrodes arranged along the length direction of the scan lines in the second area, and the third and fourth connection electrodes are provided on the layer on which the first electrode group is provided.

According to an aspect of the present invention, each of the first electrode groups, the third connection electrode, and the fourth connection electrode are provided on a lower part of the insulation layer farther from a screen of the display unit, and each of the second electrode groups is provided on an upper part of the insulation layer closer to the screen.

According to an aspect of the present invention, the insulation layer includes a plurality of first openings between the third connection electrode and the third sub-electrode and a plurality of second openings between the fourth connection electrode and the fourth sub-electrodes.

According to another exemplary embodiment of the present invention, an electronic display device includes a display unit including a plurality of scan lines to transmit a plurality of selection signals, a plurality of data lines to transmit a plurality of data signals respectively corresponding to a first image and a second image formed according to an input signal, and a plurality of pixels connected to the scan lines and the data lines, and a barrier unit covering the display unit, including a plurality of first areas and a plurality of second areas alternately arranged along a length direction of the data lines, a plurality of first sub-electrodes provided in the first area and driven in synchronization with a corresponding first selection signal among the plurality of selection signals during a first period to display the first image, a plurality of second sub-electrodes provided in the first area and is driven in synchronization with a corresponding second selection signal among the plurality of selection signals during a second period to display the second image, a plurality of third sub-electrodes provided in the second area and driven in synchronization with a corresponding third selection signal among the plurality of selection signals during the first period, and a plurality of fourth sub-electrodes provided in the second area and driven in synchronization with a corresponding fourth selection signal among the plurality of selection signals during the second period.

According to an aspect of the present invention, a portion of the barrier unit covering the first areas functions as an opaque area when the first and second images are displayed on the first areas.

According to an aspect of the present invention, a portion of the barrier unit covering the second areas functions as an opaque area when the first and second images are displayed on the second areas.

According to an aspect of the present invention, the input signal has at least a first viewing point image and a second viewing point image, the first image is generated by combining the first viewing point image and the second viewing point image in an order beginning with the first viewing point image and progressing to the second viewing point image over time, and the second image may be generated by combining the first viewing point image and the second viewing point image in an order beginning with the second viewing point image and progressing to the first viewing point image over time.

According to an aspect of the present invention, during the first period, a voltage of a first voltage level is applied to the plurality of first sub-electrodes and the plurality of third sub-electrodes, and a voltage of a second level is applied to the plurality of second sub-electrodes and the plurality of fourth sub-electrodes.

According to an aspect of the present invention, the barrier unit includes first and second substrates facing each other while having a liquid crystal layer therebetween and a common electrode formed on an inner surface of the first substrate, and the plurality of first sub-electrodes, the plurality of second sub-electrodes, the plurality of third sub-electrodes, and the plurality of fourth sub-electrodes are provided between an inner surface of the second substrate and the liquid crystal layer.

According to an aspect of the present invention, the voltage of the second level is the same as a voltage of the common electrode.

According to an aspect of the present invention, during the second period, a voltage of a first voltage level is applied to the plurality of first sub-electrodes and the plurality of third sub-electrodes, and a voltage of a second voltage level is applied to the plurality of second sub-electrodes and the plurality of fourth sub-electrodes.

According to an aspect of the present invention, the barrier unit includes first and second substrates facing each other while having a liquid crystal layer therebetween and a common electrode formed on an inner surface of the first substrate, and the plurality of first sub-electrodes, the plurality of second sub-electrodes, the plurality of third sub-electrodes, and the plurality of fourth sub-electrodes are provided between an inner surface of the second substrate and the liquid crystal layer.

According to an aspect of the present invention, the voltage of the first voltage level is the same as a voltage of the common electrode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B are diagrams representing a time-division driving method of the electronic display device according to an embodiment of the present invention;

DETAILED DESCRIPTION OF THE EMBODIMENTS

Figure 1:
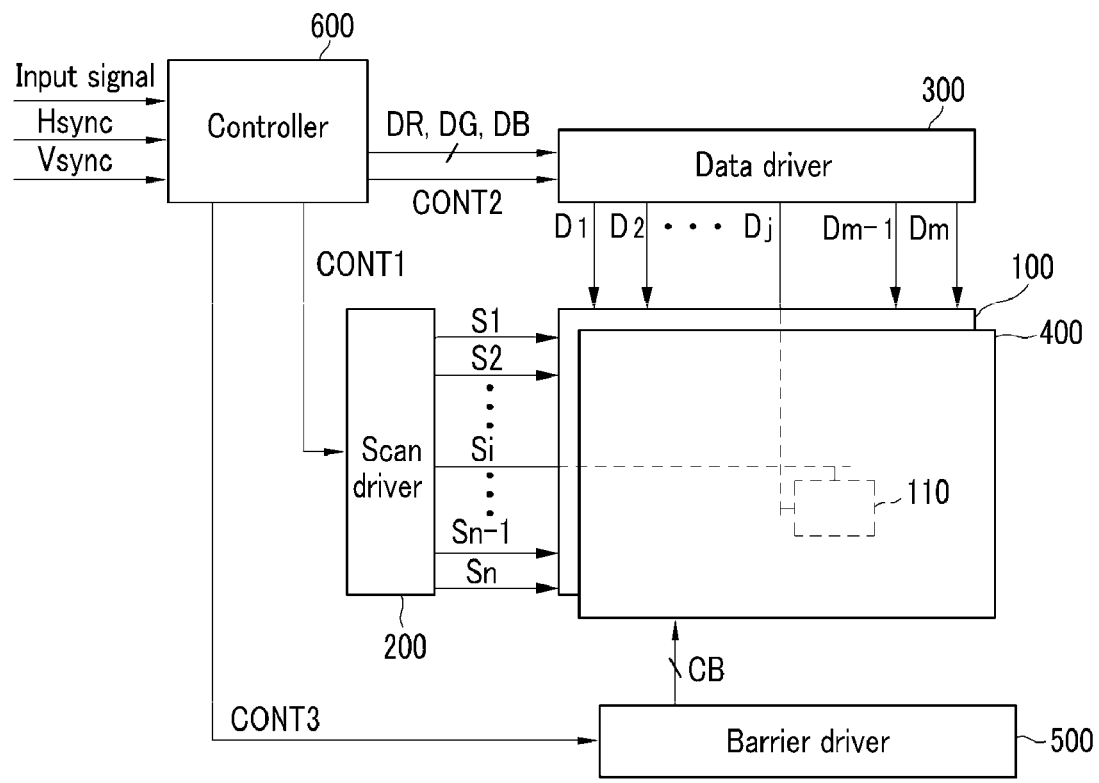
FIG. 1 is a diagram of an electronic display device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram of an electronic display device 10 according to an embodiment of the present invention. As shown in FIG. 1, the electronic display device 10 includes a display unit 100 to display an image, a scan driver 200 and a data driver 300 connected to the display unit 100, a barrier unit 400 positioned in front of the display unit 100, a barrier driver 500 connected to the barrier unit 400, and a controller 600 to control the scan driver 200, the data driver 300, and the barrier driver 500.

The display unit 100 includes a plurality of scan lines S1 to Sn to transmit selection signals, a plurality of data lines D1 to Dm crossing the plurality of scan lines S1 to Sn which are insulated from the plurality of scan lines S1 to Sn, and a plurality of pixels 110 formed at crossing regions of the scan lines S1 to Sn and the data lines D1 to Dm. Each pixel 110 includes a red sub-pixel to display a red color, a green sub-pixel to display a green color, and a blue sub-pixel to display a blue color.

According to an aspect of the present invention, the display unit 100 selectively displays at least one of a plane image or a stereoscopic image. When displaying the stereoscopic image, the display unit 100 separates pixels into left-eye pixels and right-eye pixels to simultaneously display a left-eye image and a right-eye image. The display unit 100 is formed by a display panel, such as a liquid crystal display panel, an organic light emitting display panel, or a field emission display panel which are each known in the art. When the display unit 100 is embodied as an organic light emitting display panel 100, each pixel includes an organic light emitting element and the display unit 100 includes a pixel circuit 110 to drive the organic light emitting elements.

Figure 2:
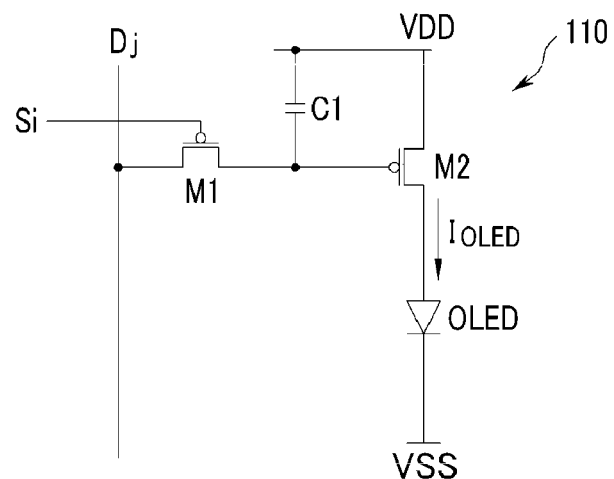
FIG. 2 is a diagram of a configuration of a pixel circuit of the electronic display device shown in FIG. 1.

FIG. 2 is a diagram of a configuration of the pixel circuit 110 of the electronic display device 10 shown in FIG. 1.

As shown in FIG. 2, the pixel circuit 110 includes a switching transistor M1, a driving transistor M2, a capacitive element C1, and an organic light emitting diode OLED. The OLED has a diode characteristic, and an accumulation configuration of an anode, an organic emission layer, and a cathode.

The pixel circuit 110 is disposed at a crossing region of one scan line Si among the plurality of scan lines and a data line Dj among the plurality of data lines, and is connected to the scan line Si and the data line Dj. The driving transistor M2 generates a driving current in response to a voltage applied to a gate electrode and a source electrode. The switching transistor M1 is turned on in response to a selection signal transmitted from the scan line Si. When the switching transistor M1 is turned on, a data signal transmitted from the data line Dj is transmitted to the gate electrode of the driving transistor M2.

Both terminals of the capacitive element C1 are connected between the gate electrode and the source electrode of the driving transistor M2, and voltages of both terminals are maintained at predetermined levels. Thereby, the driving transistor M2 generates a driving current $I_{OLED}$ corresponding to a difference between a voltage of the data signal transmitted to the gate electrode and a power source voltage applied to the source electrode. The driving current $I_{OLED}$ flows to the OLED through a drain electrode. The OLED emits light in response to the driving current $I_{OLED}$.

Referring back to FIG. 1, the scan driver 200 is connected to the scan lines S1 to Sn of the display unit 100 to apply a selection signal, which is formed by a combination of a gate-on voltage and a gate-off voltage, to the scan line Si. In this case, the scan driver 200 respectively applies a plurality of selection signals to the plurality of scan lines S1 to Sn, so that the selection signals sequentially have the gate-on voltage. When one of the selection signals has the gate-on voltage, the switching transistor of the pixel circuit 110 that is connected to the corresponding scan line Si is turned on.

The data driver 300 is connected to the data lines D1 to Dm of the display unit 100 to apply a data signal expressing a grayscale to the data lines D1 to Dm. The data driver 300 converts input data DR, RG, and DB having grayscales that are received from the controller 600 into data signals of a voltage type or a current type.

The controller 600 externally receives an input signal, a horizontal synchronization signal Hsync, and a vertical synchronization signal Vsync to generate a scan control signal CONT1, a data control signal CONT2, image data signals DR, DG, and DB, and a barrier driver control signal CONT3. The controller 600 applies the scan control signal CONT1 to the scan driver 200, applies the data control signal CONT2 and the image data signals DR, DG, and DB to the data driver 300, and applies the barrier driver control signal CONT3 to the barrier driver 500.

The scan control signal CONT1 includes a scan start signal to command the scan driver 100 to start a scanning operation, and a first clock signal. According to an aspect of the present invention, the scan start signal is synchronized with the vertical synchronization signal which is used to start a transmission of image data of one frame to control a start time used to display an image of the one frame on the display unit 100. The first clock signal is also synchronized with the horizontal synchronization signal which is used to start a transmission of image data transmission with respect to the pixel of one row to transmit the selection signals to the respective scan lines S1 to Sn.

The data control signal CONT2 includes a second clock signal having a predetermined cycle in synchronization with the horizontal synchronization signal, and a horizontal synchronization start signal to control a data signal transmission start.

The input signal input to the controller 600 is at least one of plane image data, 3D graphics data including three-dimensional space coordinates and surface information of an object to stereoscopically display an image on a plane surface, and stereoscopic image data including each viewing point image data. It is understood that the input signal may be only one of these types of data, or may be a combination of these types of data.

When the input signal is the stereoscopic image data, the controller 600 generates the barrier driver control signal CONT3 to drive the barrier unit 400 according to the selection signal transmitted to the plurality of scan lines S1 to Sn, and transmits the barrier driver control signal CONT3 to the barrier driver 500. According to an aspect of the present invention, the barrier unit 400 is divided into a plurality of areas along a length direction of the data lines D1 to Dm, and is synchronized with a time at which the selection signal is transmitted to one scan line among the plurality of scan lines S1 to Sn corresponding to the respective plurality of areas, so that the respective areas of the barrier unit 400 are controlled to be driven.

When the scan driver 200 respectively transmits the selection signal to the plurality of scan lines S1 to Sn according to the first clock signal, the controller 600 uses the first clock signal to determine which scan line among the scan lines corresponding to the plurality of areas of the barrier unit 400 receives the selection signal. The controller 600 generates the barrier driver control signal CONT3 to drive the barrier unit 400 in synchronization with a time at which the selection signal is transmitted to one scan line of the plurality of scan lines S1 to Sn. Thereby, the barrier driver 500 drives the barrier unit 400 or stops an operation of the barrier unit 400 according to the barrier driver control signal CONT3.

The barrier driver 500 generates a plurality of barrier driving signals CB to control the plurality of areas forming the barrier unit 400 and transmits the barrier driving signals CB to the barrier unit 400. The barrier unit 400 and the barrier driver 500 will be described later in detail.

The electronic display device 10 realizes a stereoscopic image by using a time-division driving method. FIGS. 3A and 3B are diagrams representing a time-division driving method used with the electronic display device 10 according to an embodiment of the present invention.

When one frame is driven while being divided into two periods including the first period T1 and the second period T2, an image (hereinafter referred to as a "left-right image") combined in an order beginning with the image initially seen by the left-eye and progressing to the image seen by the right-eye along the horizontal direction of the screen is displayed during the first period T1 in FIG. 3A. Another image (hereinafter referred to as a "right-left image") combined in an order beginning with the image initially seen by the right-eye and progressing to the image seen by the left-eye along the horizontal direction of the screen is displayed during the second period T2 in FIG. 3B.

As shown in FIG. 3A, during the first period T1, an odd-numbered pixel OP of the display unit 100 is the left-eye pixel, i.e., the pixel seen by the left eye of a viewer, and an even-numbered pixel EP is the right-eye pixel, i.e., the pixel seen by the right eye of the viewer. A series of light blocking portions 12 and a series of light transmitting portions 14 are alternately arranged along the horizontal direction of the screen in the barrier unit 400. Thereby, paths to transmit the left-eye image and the right-eye image to the left eye and the right eye of a viewer are formed.

As shown in FIG. 3B, during the second period T2, the odd-numbered pixel OP of the display unit 100 is the right-eye pixel, and the even-numbered pixel EP is the left-eye pixel. The series of light transmitting portions 14 and the series of light blocking portions 12 are alternately arranged along the horizontal direction of the screen in the barrier unit 400. Thereby, paths to transmit the right-eye image and the left-eye image to the right eye and the left eye of the viewer are formed.

As described above, the left-eye image and the right-eye image that are separated by the barrier unit 400 have a spatial disparity with respect to each other, and the viewer using the electronic display device 10 obtains depth information that is the same as an actual stereoscopic object to perceive a stereoscopic effect. In addition, since one frame is divided into the first period T1 and the second period T2, the viewer observes a stereoscopic image of a resolution that is the same resolution as a plane image.

However, since an image is displayed along a scan direction to sequentially transmit the selection signal to the plurality of scan lines S1 to Sn, when the left-right image is displayed during the first period T1 and the right-left image is displayed during the second period T2, an area where the left-right image and the right-left image are seen together is generated on the display unit 100.

As described above, the barrier unit 400 is divided into the plurality of areas along the scan direction (the length direction of the data lines D1 to Dm and the vertical direction of the screen in FIG. 1) of the display unit 100. The respective areas are driven synchronously with the image sequentially changed along the scan direction.

Figure 4:
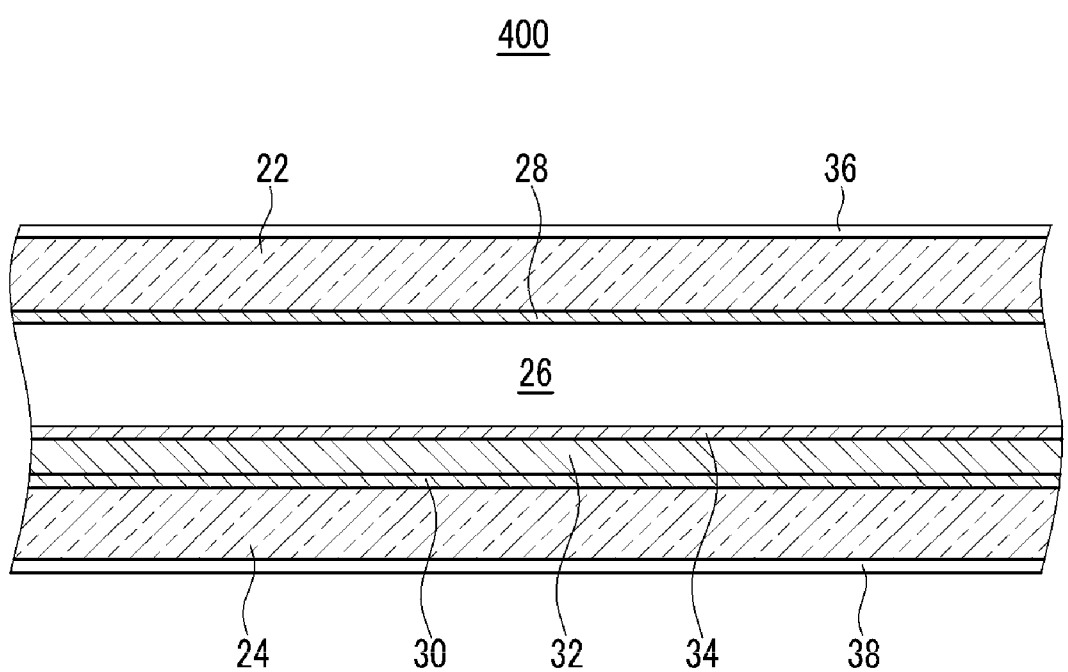
FIG. 4 is a cross-sectional view representing a barrier unit included in the electronic display device according to an embodiment of the present invention.

FIG. 4 is a cross-sectional view representing the barrier unit 400 of the electronic display device 10 according to an embodiment of the present invention. As shown in FIG. 4, the barrier unit 400 includes a first substrate 22 and a second substrate 24 arranged opposite to each other with a predetermined gap therebetween, a liquid crystal layer 26 provided between the first substrate 22 and the second substrate 24, a common electrode 28 formed on an inner surface of the first substrate 22, a first electrode layer 30 formed on an inner surface of the second substrate 24, a second electrode layer 34 provided on an upper part of the first electrode layer 30 and having an insulation layer 32 disposed between the second electrode layer 34 and the first electrode layer 30, and first and second polarizing plates 36 and 38 respectively provided on outer surfaces of the first substrate 22 and the second substrate 24.

According to an aspect of the present invention, the common electrode 28 is formed on the entire active area of the first substrate 22, although it is understood that the common electrode 28 may be formed on less than an entire active area of the first substrate 22 according to other aspects. A first electrode group 40 (FIG. 5) and a second electrode group 42 (FIG. 7) are provided in the first electrode layer 30 and the second electrode layer 34, respectively. According to aspects of the present invention, the first substrate 22 on which the common electrode 28 is provided may be a front substrate of the barrier unit 400 which is located relatively close to a screen of the display unit 100, or vice versa, i.e., the second substrate 24 may instead be located relatively close to the screen of the display unit 100. The common electrode 28, the first electrode group 40, and the second electrode group 42 are formed as a transparent conductive layer, and the insulation layer 32 is formed of a transparent insulation material.

An arrangement layer (not shown) is provided on one surface of the common electrode 28 facing the liquid crystal layer 26 and one surface of the second electrode group facing the liquid crystal layer 26. The first polarizing plate 36 and the second polarizing plate 38 are arranged so that polarization axes of the first polarizing plate 36 and the second polarizing plate 38 are perpendicular to each other.

Figure 5:
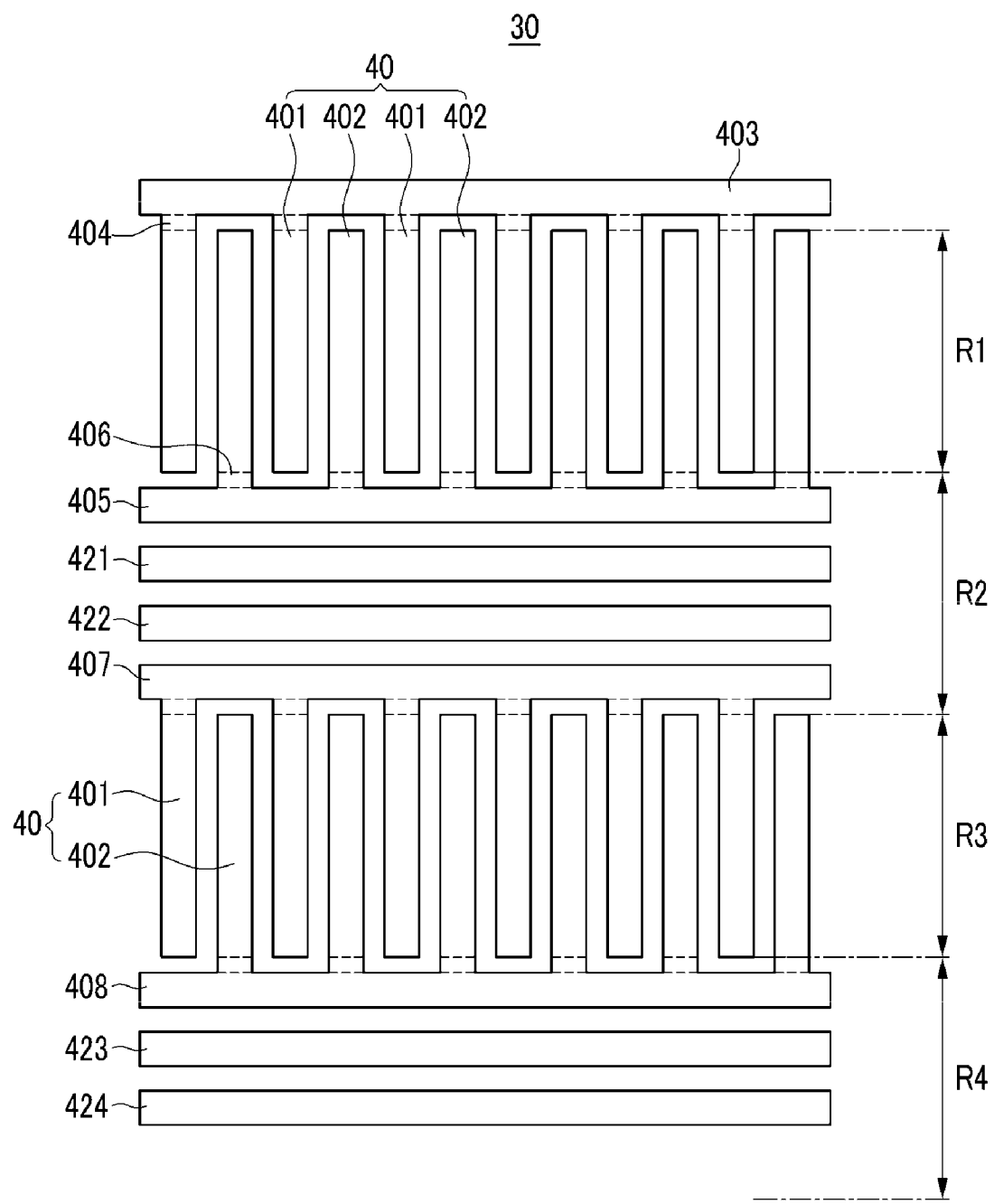
FIG. 5 is a top plan view representing an electrode arrangement of a first electrode layer of the barrier unit shown in FIG. 4.

FIG. 5 is a top plan view representing an electrode arrangement of the first electrode layer 30 of the barrier unit 400 shown in FIG. 4. As shown in FIG. 5, the barrier unit 400 is divided into a plurality of areas R1, R2, R3, and R4 along the scan direction of the display unit 100. The plurality of areas R1, R2, R3, and R4 includes first areas R1 and R3 arranged in an odd-numbered order, and second areas R2 and R4 arranged in an even-numbered order. In FIG. 5, while the barrier unit 400 is illustrated as being divided into four areas R1, R2, R3, and R4, the barrier unit 400 is not limited thereto, and may instead be divided into more or less than four areas.

On one group of the areas of either the first areas R1 and R3 or the second areas R2 and R4 in the first electrode layer 30 of the barrier unit 400 (e.g., on the first areas R1 and R3), a plurality of first sub-electrodes 401 and a plurality of second sub-electrodes 402 are alternately arranged along the length direction of the scan line (i.e., the horizontal direction of the screen). The first electrode group 40 includes a plurality of first sub-electrodes 401 and a plurality of second sub-electrodes 402. According to an aspect of the present invention, the respective first and second sub-electrodes 401 and 402 are formed in long slit shapes along the scan direction of the display unit 100 (i.e., the vertical direction of the screen). It is understood that the respective first and second sub-electrodes 401 and 402 are not limited to being formed in a long slit shapes, however, and may instead be formed in various other shapes, such as squares, curved shapes, or a combination thereof.

Each of the first sub-electrodes 401 and the second sub-electrodes 402 include a first end (the upper end in FIG. 5) and a second end (the lower end in FIG. 5) along the vertical direction of the screen. A first connection electrode 403 is provided on an outer side of the first end along the horizontal direction of the screen, and a first connecting portion 404 is formed between the first sub-electrode 401 and the first connection electrode 403 to electrically connect the first sub-electrode 401 and the first connection electrode 403. A second connection electrode 405 is provided on an outer side of the second end along the horizontal direction of the screen, and a second connecting portion 406 is formed between the second sub-electrode 402 and the second connection electrode 405 to electrically connect the second sub-electrode 402 and the second connection electrode 405.

In this case, the first connection electrode 403, the first connecting portion 404, the second connection electrode 405, and the second connecting portion 406 are provided on the outside of the area R1 (also referred to as the "1/4 area R1") in which the first electrode group 40 is provided. That is, as shown in FIG. 5, the first connection electrode 403 and the first connecting portion 404 are formed on an upper outside region of the 1/4 area R1, and the second connection electrode 405 and the second connecting portion 406 are formed on a lower outside region of the 1/4area R1. The first connection electrode 403 functions as a wire of the first sub-electrodes 401, and the second connection electrode 405 functions as a wire of the second sub-electrodes 402.

In addition, the second electrode group 42 (FIG. 7) includes a plurality of third sub-electrodes 427 and a plurality of fourth sub-electrodes 428 provided on the second areas R2 and R4 of the barrier unit 400. On the area R2 (also referred to as the "2/4 area R2"), a third connection electrode 421 which functions as a wire of the third sub-electrodes 427 and a fourth connection electrode 422 which functions as a wire of the fourth sub-electrodes 428 are formed along the horizontal direction of the screen. In addition, a fifth connection electrode 407 connected to the first sub-electrodes 401 provided on the area R3 (also referred to as the "3/4 area R3") is provided on the 2/4 area R2.

A sixth connection electrode 408 connected to the second sub-electrodes 402 provided on the 3/4 area R3 is provided on the area R4 (also referred to as the "4/4 area R4") of the barrier unit 400 along the horizontal direction of the screen. In addition, a seventh connection electrode 423 which functions as a wire of the third sub-electrodes 427 and an eighth connection electrode 424 which functions as a wire of the fourth sub-electrodes 428 are provided on the 4/4 area R4 along the horizontal direction of the screen.

Figure 6:
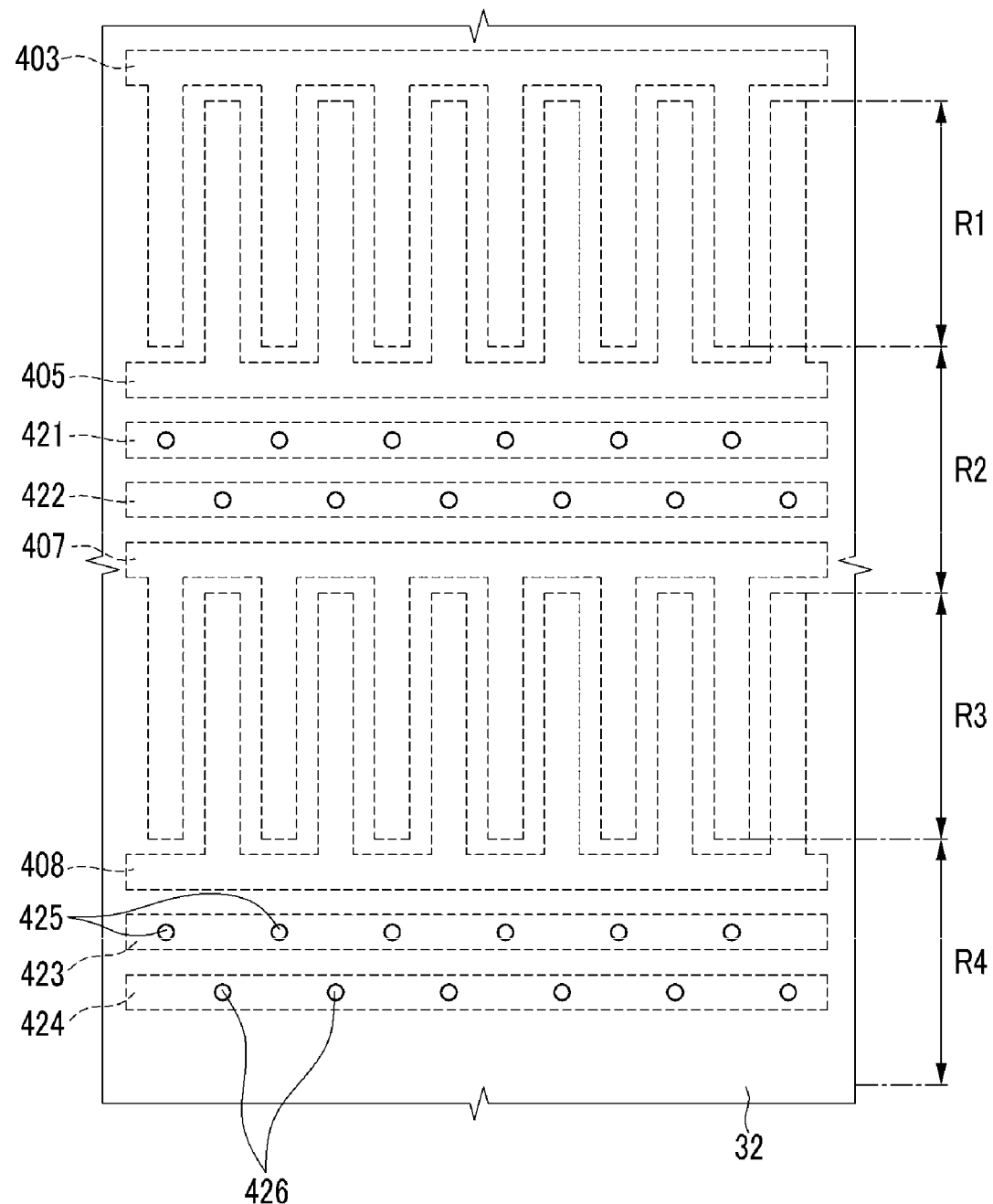
FIG. 6 is a top plan view of an insulation layer of the barrier unit shown in FIG. 4.

FIG. 6 is a top plan view of the insulation layer of the barrier unit shown in FIG. 4. As shown in FIG. 6, the insulation layer 32 is formed across the entire second substrate 24 and covers the first electrode group 40 formed on the first electrode layer 30 and first to eighth electrodes 403, 405, 421, 422, 407, 408, 423, and 424. In the insulation layer 32, a plurality of first openings 425 are formed throughout the third connection electrode 421 and the seventh connection electrode 423, and a plurality of second openings 426 are formed throughout the fourth connection electrode 422 and the eighth connection electrode 424.

The first openings 425 are formed to be matched with center regions of the first sub-electrodes 401 along the vertical direction of the screen, and form electrical connection paths between the third connection electrodes 421 and the third sub-electrodes 427 and electrical connection paths between the seventh connection electrodes 423 and the third sub-electrodes 427. The second openings 426 are formed to be matched with center regions of the second sub-electrodes 402 along the vertical direction of the screen, and form electrical connection paths between the fourth connection electrodes 422 and the fourth sub-electrodes 428 and electrical connection paths between the eighth connection electrodes 424 and the fourth sub-electrodes 428.

Figure 7:
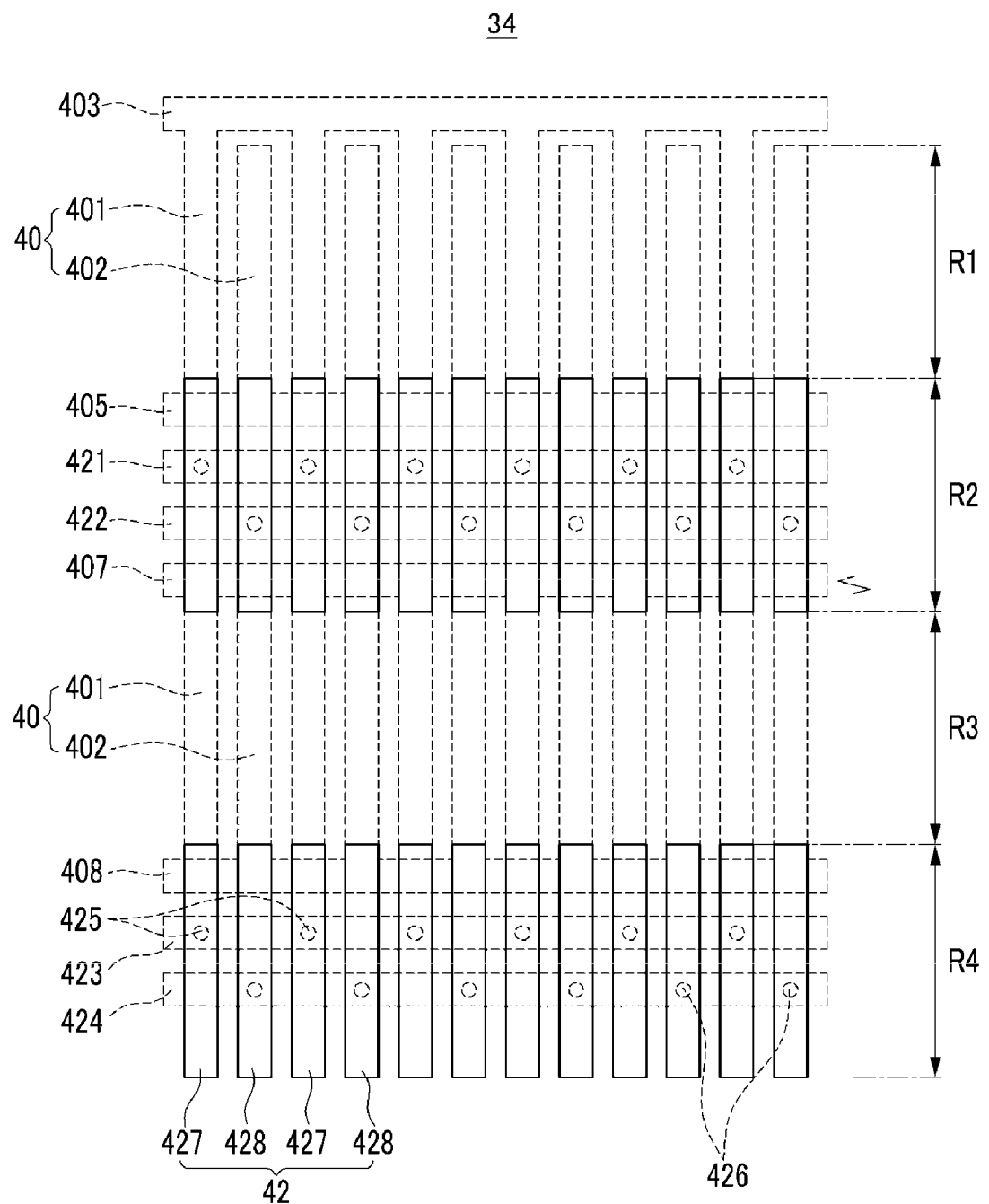
FIG. 7 is a top plan view of an arrangement of a second electrode layer of the barrier unit shown in FIG. 4.

FIG. 7 is a top plan view of an arrangement of the second electrode layer 34 of the barrier unit shown in FIG. 4. As shown in FIG. 7, on the second electrode layer 34 of the barrier unit 400 on the insulation layer 32, the third sub-electrodes 427 and the fourth sub-electrodes 428 are alternately arranged in the second areas R2 and R4 along the horizontal direction of the screen. The plurality of third sub-electrodes 427 and the plurality of fourth sub-electrodes 428 form the second electrode group 42. The respective third and fourth sub-electrodes 427 and 428 are formed in long slit shapes along the vertical direction of the screen. It is understood that the respective third and fourth sub-electrodes 427 and 428 are not limited to being formed in a long slit shapes, however, and may instead be formed in various other shapes, such as squares, curved shapes, or a combination thereof.

The third sub-electrodes 427 in the 2/4 area R2 are electrically connected to the third connection electrode 421 through the first opening 425. The fourth sub-electrodes 428 in the 2/4 area R2 are electrically connected to the fourth connection electrode 422 through the second opening 426. The third sub-electrodes 427 in the 4/4 area R4 are electrically connected to the seventh connection electrode 423 through the first opening 425. The fourth sub-electrodes 428 in the 4/4 area R4 are electrically connected to the eighth connection electrode 424 through the second opening 426.

The third sub-electrode 427 and the fourth sub-electrode 428 positioned in the 2/4 area R2 overlap with the second connection electrode 405 and the fifth connection electrode 407, and the third sub-electrode 427 and the fourth sub-electrode 428 positioned in the 4/4 area R4 overlap with the sixth connection electrode 408. Accordingly, the third sub-electrode 427 neighbors the first sub-electrode 401 without a gap therebetween along the vertical direction of the screen, and the fourth sub-electrode 428 neighbors the second sub-electrode 402 without a gap therebetween along the vertical direction of the screen.

In a configuration where the first sub-electrode 401 and the third sub-electrode 427 neighbor each other and the second sub-electrode 402 and the fourth sub-electrode 428 neighbor each other along the vertical direction of the screen, when the respective areas of the barrier unit 400 are selectively driven, a viewer does not see boundary parts between the areas on the screen. An operation of the barrier unit 400 will be described later in detail.

Figure 8:
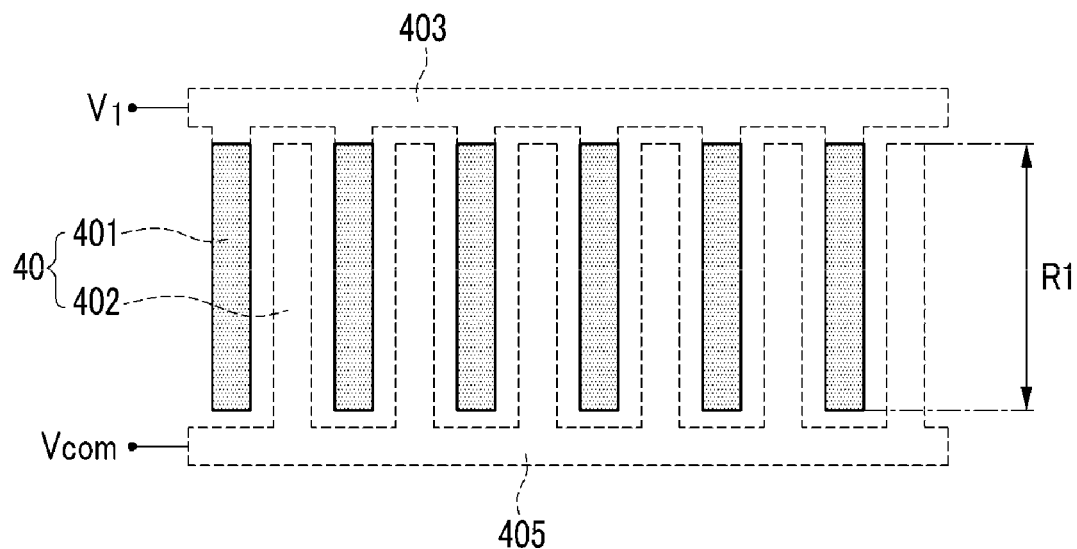
FIG. 8 and FIG. 9 are schematic diagrams to describe an operation of a first electrode group in the barrier unit shown in FIG. 7.
Figure 9:
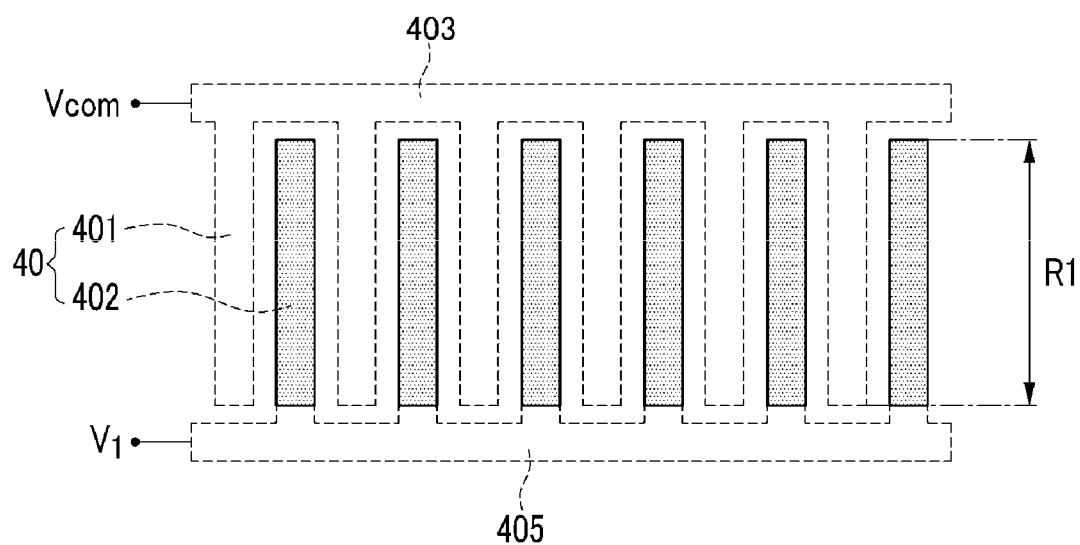

FIG. 8 and FIG. 9 are schematic diagrams to describe an operation of the first electrode group 40 in the barrier unit 400 shown in FIG. 7. Referring to FIG. 8, when the barrier unit 400 is in a normal white mode to transmit light therethrough when no voltage is applied to the barrier unit 400, and a liquid crystal driving voltage V1 (i.e., a voltage corresponding to a voltage difference to operate liquid crystal molecules with respect to the common electrode 28) is applied to the first connection electrode 403, a twisting angle of the liquid crystal molecules varies in an area where the plurality of first sub-electrodes 401 is provided. Accordingly, the plurality of first sub-electrodes 401 optically becomes a light blocking portion, and remaining parts of the first electrode group 40 become a light transmitting portion. A voltage Vcom that is the same as that of the common electrode 28 is applied to the second connection electrode 405 and the second sub-electrode 402, or the second connection electrode 405 and the second sub-electrode 402 are floated.

Referring to FIG. 9, when the liquid crystal driving voltage V1 is applied to the second connection electrode 405, the twisting angle of the liquid crystal molecules varies in an area where the plurality of second sub-electrodes 402 is provided. Accordingly, the plurality of second sub-electrodes 402 optically becomes the light blocking portion, and remaining parts of the first electrode group 40 become the light transmitting portion. The voltage Vcom that is the same as that of the common electrode 28 is applied to the first connection electrode 403 and the first sub-electrode 401, or the first connection electrode 403 and the first sub-electrode 401 are floated.

Figure 10:
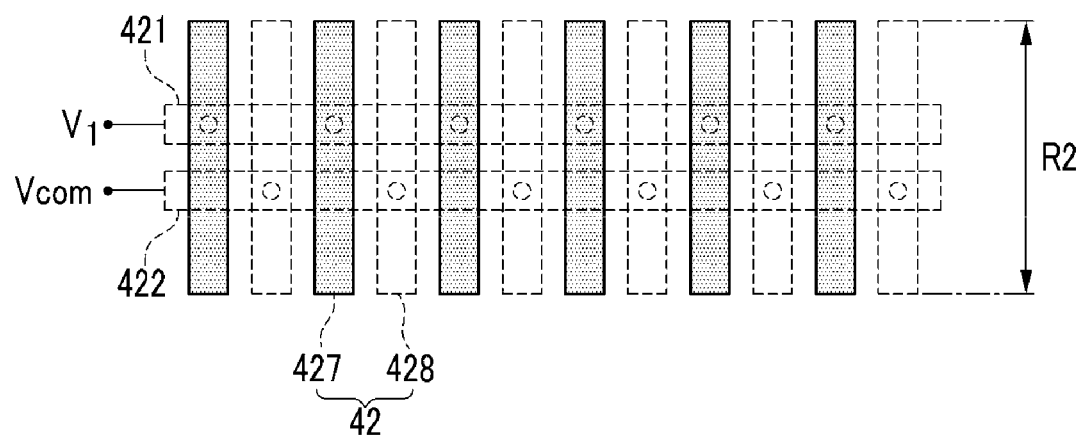
FIG. 10 and FIG. 11 are schematic diagrams to describe an operation of a second electrode group in the barrier unit shown in FIG. 7.
Figure 11:
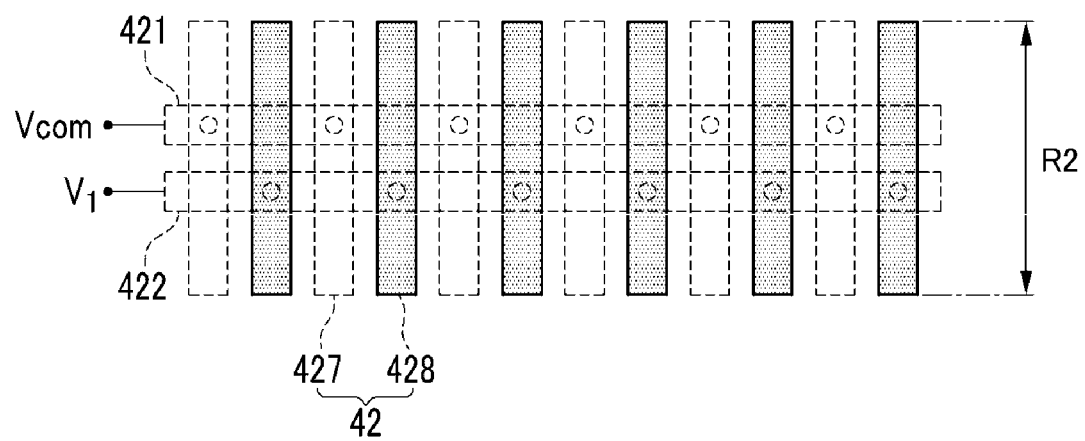

FIG. 10 and FIG. 11 are schematic diagrams to describe an operation of the second electrode group 42 in the barrier unit shown in FIG. 7. Referring to FIG. 10, when the liquid crystal driving voltage V1 is applied to the third connection electrode 421, the twisting angle of the liquid crystal molecules is varied in an area where the plurality of third sub-electrodes 427 is provided. Accordingly, the plurality of third sub-electrodes 427 optically becomes the light blocking portion, and the remaining parts of the second electrode group 42 become the light transmitting portion. In this case, since the fourth connection electrode 422 is seen as a black-colored line when the fourth connection electrode 422 is floated, the voltage Vcom that is the same as that of the common electrode 28 is applied to the fourth connection electrode 422 and the fourth sub-electrode 428.

Referring back to FIG. 11, when the liquid crystal driving voltage V1 is applied to the fourth connection electrode 422, the twisting angle of the liquid crystal molecules is varied in an area where the plurality of fourth sub-electrodes 428 is provided. Accordingly, the plurality of fourth sub-electrodes 428 optically becomes the light blocking portion, and the remaining parts of the second electrode group 42 become the light transmitting portion. In this case, since the third connection electrode 421 is seen as a black colored line when the third connection electrode 421 is floated, the voltage Vcom that is the same as that of the common electrode 28 is applied to the third connection electrode 421 and the third sub-electrode 427.

Figure 12:
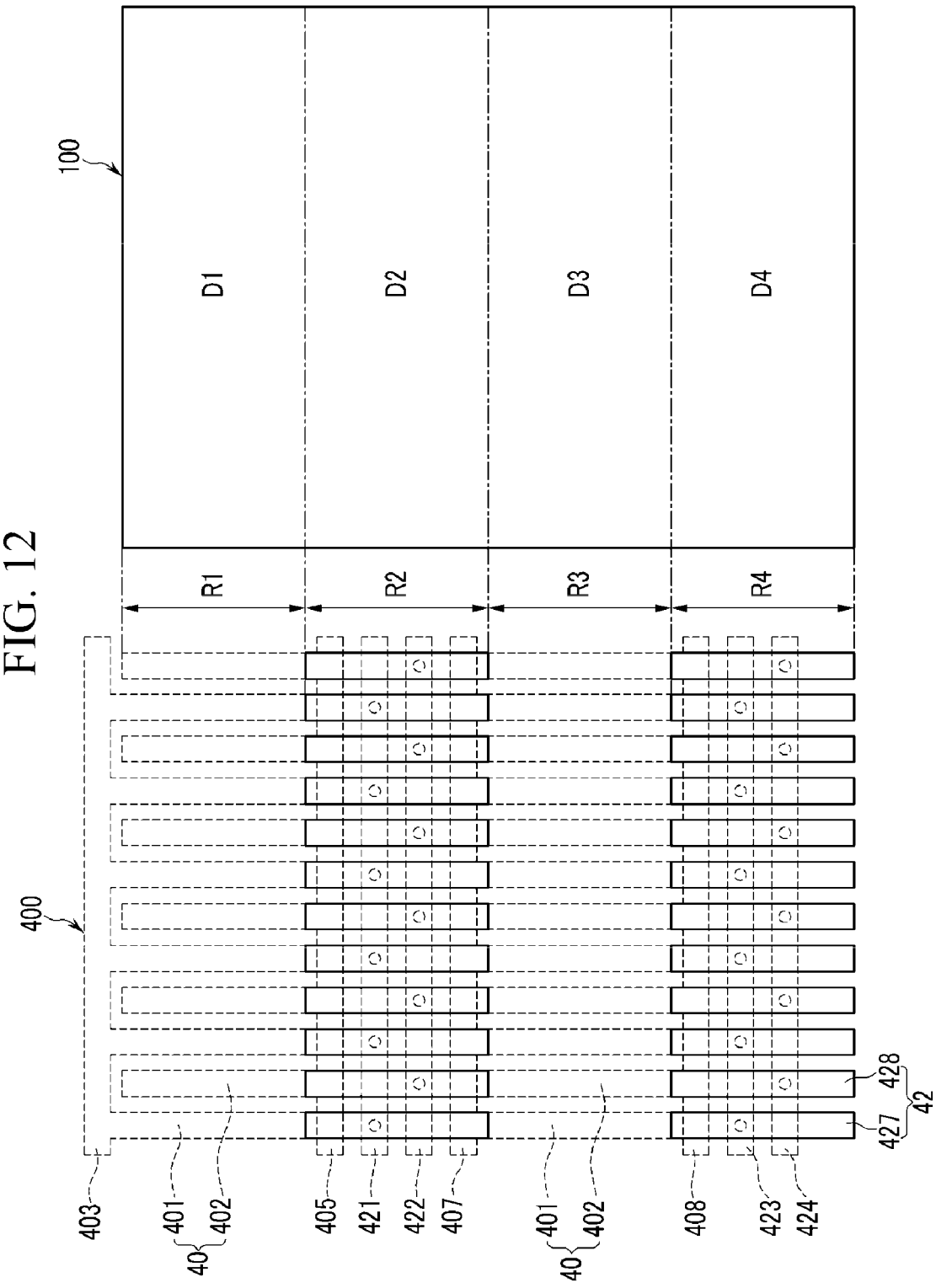
FIG. 12 is a schematic diagram to describe a relationship between the display unit and the barrier unit in the electronic display device according to an embodiment of the present invention.

FIG. 12 is a schematic diagram to describe a relationship between the display unit 100 and the barrier unit 400 in the electronic display device 10 according to aspects of the present invention. As shown in FIG. 12, the display unit 100 is divided into four areas D1, D2, D3, and D4, and the barrier unit 400 is divided into the four areas R1, R2, R3, and R4 corresponding to the divided areas D1, D2, D3, and D4 of the display unit 100. First electrode groups 40 including the plurality of first sub-electrodes 401 and the plurality of second sub-electrodes 402 are provided in the first areas R1 and R3 arranged in an odd-numbered order. Second electrode groups 42 including the plurality of third sub-electrodes 427 and the plurality of fourth sub-electrodes 428 are provided in the second areas R2 and R4 arranged in an even-numbered order.

The number of areas of the display unit 100 and the barrier unit 400 is not limited as described above and shown in FIG. 12, and may instead be more or less than four areas. Furthermore, locations of the first electrode groups 40 and the second electrode groups 42 are not limited as described above and shown in FIG. 12, and may instead be changed in various ways. That is, the first electrode groups 40 may be provided to the second areas R2 and R4, and the second electrode groups 42 may be provided to the first areas R1 and R3.

An operation of the electronic display device 10 according to an embodiment of the present invention will now be described with reference to FIG. 13 and FIGS. 14A-14H.

Figure 13:
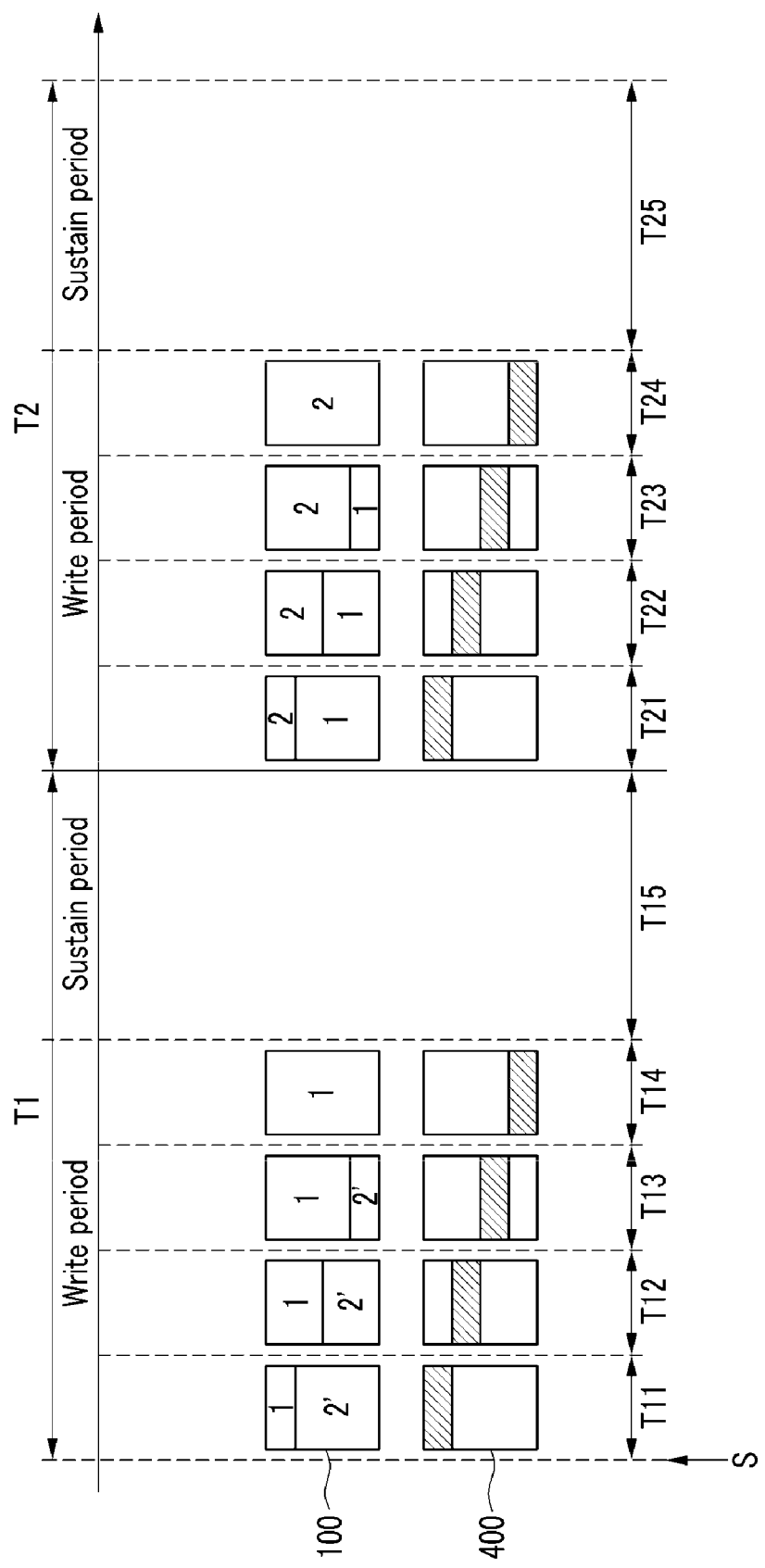
FIG. 13 is a diagram representing a process to display a left-right image during a first period and a right-left image during a second period in the display unit according to an embodiment of the present invention.
Figure 14:
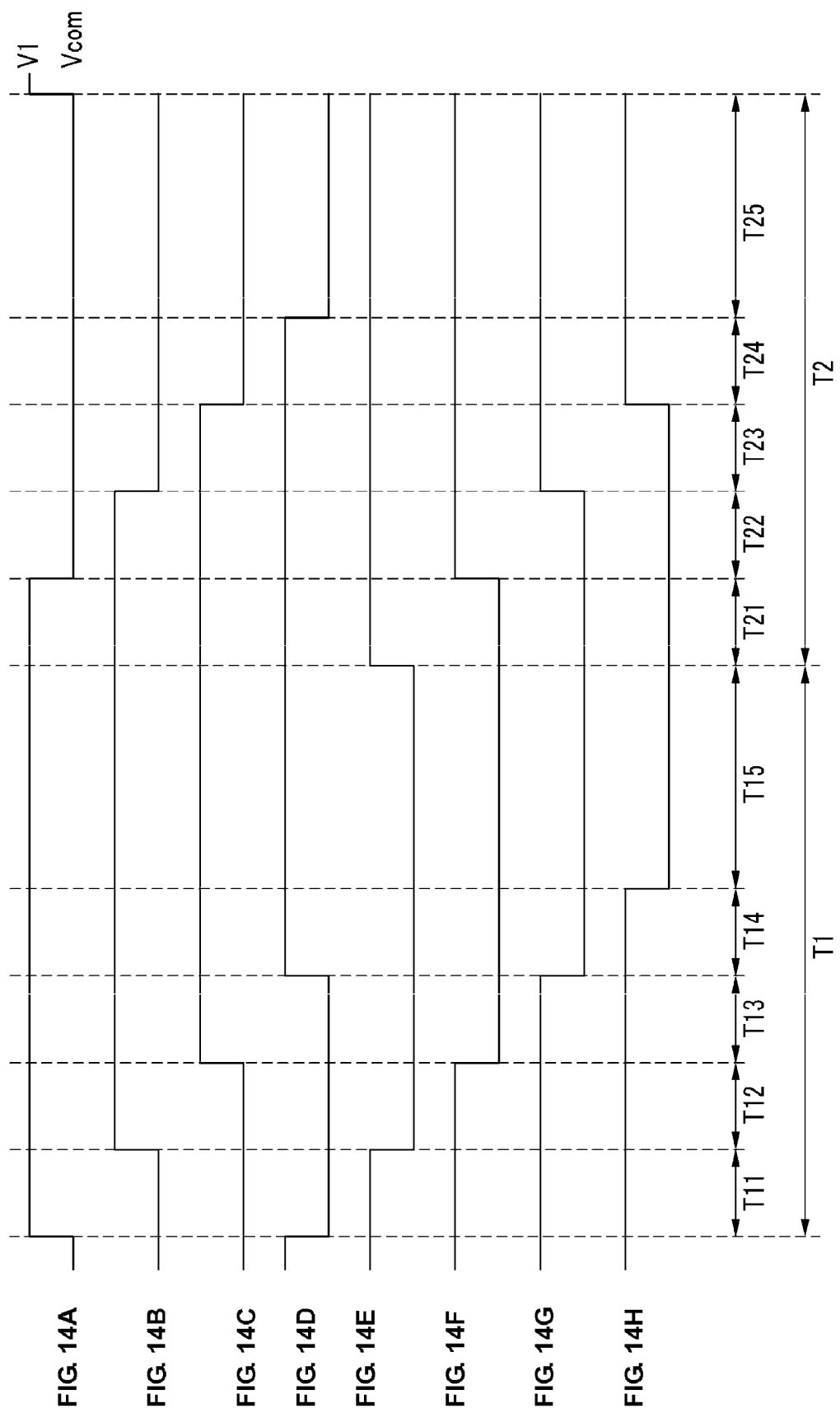
FIGS. 14A-14H are diagrams representing barrier driving signals transmitted from a barrier driver to a plurality of connection electrodes.

FIG. 13 is a diagram representing a process to display the left-right image during the first period T1 and the right-left image during the second period T2 in the display unit 100 according to an embodiment of the present invention. FIG. 13 shows images displayed on the respective areas of the display unit 100 as time proceeds and modes of the barrier unit 400 according to the displayed images.

FIGS. 14A-14H are diagrams respectively representing barrier driving signals CB11, CB12, CB13, CB14, CB21, CB22, CB23, and CB24, transmitted from the barrier driver 500 to the plurality of connection electrodes 403, 405, 421, 422, 407, 408, 423, and 424. Four barrier driving signals CB11 14 are respectively applied to the first, third, fifth, and seventh connection electrodes 403, 421, 407, and 423 (hereinafter also referred to as the "first group connection electrodes"), and four barrier driving signals CB21 to CB24 are respectively applied to the second, fourth, sixth, and eighth connection electrodes 405, 422, 408, and 424 (hereinafter also referred to as the "second group connection electrodes").

The barrier driving signals CB11 to CB14 and CB21 to CB24 applied to the first through eighth connection electrodes 403, 405, 421, 422, 407, 408, 423, and 424 alternately have the liquid crystal driving voltage V1 and the common voltage Vcom. A new image is written to the display unit 100 during write periods T11, T12, T13 and 14 and T21, T22, T23, and T24. That is, when the selection signals are sequentially applied to the scan lines of the display unit 100, a plurality of data signals is written to pixels along the plurality of data lines during the written periods T11 to 14 and T21 to 24. An image is maintained for a predetermined time according to a written data signal during sustain periods T15 and T25.

First, a right-left image 2' of an immediately previous frame is displayed on the entire screen immediately before a time when a left-right image 1 begins to be displayed. When the left-right image 1 of the current frame starts to be written in the display unit 100, the left-right image 1 starts to be displayed along the scan direction of the display unit 100 (i.e., the vertical direction of the screen in FIG. 13). Hereinafter, for better understanding and ease of description, it will be assumed that a total time for changing the right-left image 2' to the left-right image 1 is 1 unit of time, such as 1 millisecond, etc.

According to aspects of the present invention, the barrier unit 400 is divided into the four areas R1, R2, R3, and R4, and the display unit 100 is divided into the four areas D1, D2, D3, and D4. The barrier driving signals CB11 to CB14 and CB21 to CB24 having levels of the liquid crystal driving voltage V1 are respectively applied to the first group connection electrodes 403, 421, 407, and 423 and the second group connection electrodes 405, 422, 408, and 424 in synchronization with a time to transmit a first selection signal among the plurality of selection signals to the respective areas of the display unit 100.

The liquid crystal driving voltage V1 is sequentially applied to the first group connection electrodes 403, 421, 407, and 423 corresponding to the left-right image of the current frame during the first period T1. The liquid crystal driving voltage V1 is sequentially applied to the second group connection electrodes 405, 422, 408, and 424 corresponding to the right-left image of the current frame during the second period T2. Since the common voltage Vcom is applied to the first group connection electrodes 403, 421, 407, and 423 and the second group connection electrodes 405, 422, 408, and 424 in an area where the right-left image and the left-right image are displayed together, the light blocking portion is optically formed.

During the period T11 which is a first quarter of a time period where the right-left image 2' is changed to the left-right image 1, the left-right image 1 is displayed on the 1/4 area D1 of the display unit 100 along the scan direction, and the right-left image 2' remains in the remaining areas D2, D3, and D4. In this case, the left-right image 1 and the right-left image 2' are displayed together on the 1/4 area D1 during the entire period T11 (i.e., before the left-image 1 is displayed on the entire 1/4 area D1). Thereby, since the image of the current frame and the image of the previous image are displayed together, image quality may deteriorate.

To prevent the image deterioration, the barrier driving signals CB11 and CB21 have the level of the liquid crystal driving voltage V1, and the liquid crystal driving voltage V1 is applied to the first connection electrode 403 and the second connection electrode 405. Thereby, the image of the 1/4 area D1 of the display unit 100 is interrupted. The barrier driving signals CB22, CB23, and CB24 have the level of the liquid crystal driving voltage V1, the barrier driving signals CB12, CB13, and CB14 have the level of the common voltage Vcom, and therefore the right-left image 2' is displayed as a stereoscopic image in the areas D2, D3, and D4 of the display unit 100.

During the period T12 which is a second quarter of a time period where the right-left image 2' is changed to the left-right image 1, the left-right image 1 is displayed on the 1/4 and 2/4 areas D1 and D2 along the scan direction of the display unit 100, and the right-left image 2' remains in the 3/4 and 4/4 areas D3 and D4. In this case, since the left-right image 1 and the right-left image 2' are displayed together on the 2/4 area D2 of the display unit 100, the barrier driving signals CB12 and CB22 have the level of the liquid crystal driving voltage V1, and the liquid crystal driving voltage V1 is applied to the third connection electrode 421 and the fourth connection electrode 422. Thereby, the image of the 2/4 area D2 of the display unit 100 is interrupted. In addition, the barrier driving signals CB11, CB23, and CB24 have the level of the liquid crystal driving voltage V1, and the barrier driving signals CB21, CB13, and CB14 have the level of the common voltage Vcom. The left-right image 1 is displayed as a stereoscopic image in the 1/4 area D1 of the display unit 100, and the right-left image 2' is displayed as a stereoscopic image in the 3/4 and 4/4 areas D3 and D4.

During the period T13 which is a third quarter of a time period where the right-left image 2' is changed to the left-right image 1, the left-right image 1 is displayed in the 1/4, 2/4, and 3/4 areas D1, D2, and D3 along the scan direction of the display unit 100, and the right-left image 2' remains in the 4/4 area D4. Here, the barrier driving signals CB13 and CB23 have the level of the liquid crystal driving voltage V1, and the liquid crystal driving voltage V1 is applied to the fifth connection electrode 407 and the sixth connection electrode 408. Thereby, the image of the 3/4 area D3 of the display unit 100 is interrupted. In addition, the barrier driving signals CB11, CB12, and CB24 have the levels of the liquid crystal driving voltage V1, and the barrier driving signals CB21, CB22, and CB14 have the level of the common voltage Vcom. The left-right image 1 is displayed as a stereoscopic image in the 1/4 and 2/4 areas D1 and D2 of the display unit 100, and the right-left image 2' is displayed as a stereoscopic image in the 4/4 area D4.

During the period T14 which is a fourth quarter of a time period where the right-left image 2' is changed to the left-right image 1, the left-right image 1 is displayed in all the areas D1, D2, D3, and D4 along the scan direction of the display unit 100. Here, the barrier driving signals CB14 and CB24 have the level of the liquid crystal driving voltage V1, and the liquid crystal driving voltage V1 is applied to the seventh connection electrode 423 and the eighth connection electrode 424. Thereby, the image of the 4/4 area of the display unit 100 is interrupted. In addition, the barrier driving signals CB11, CB12, and CB13 have the level of the liquid crystal driving voltage V1, and the barrier driving signals CB21, CB22, and CB23 have the level of the common voltage Vcom. The left-right image 1 is displayed as a stereoscopic image in the 1/4 to 3/4 areas D1 to D3 of the display unit 100.

During the period T15 that is the sustain period, the left-right image 1 is maintained for a predetermined time after the left-right image 1 is displayed on all the areas D1, D2, D3, and D4 of the display unit 100. In this case, the barrier driving signals CB11 to CB14 have the levels of the liquid crystal driving voltage V1, and the barrier driving signals CB21 to CB24 have the levels of the common voltage Vcom. Thereby, the left-right image 1 is displayed as a stereoscopic image in the areas D1, D2, D3, and D4 of the display unit 100.

An operation of the second period T2 will now be described with reference to FIGS. 13 and 14A-14H.

First, during the period T21 which is a first quarter of a time period where the left-right image 1 is changed to the right-left image 2, the right-left image 2 is displayed in the 1/4 area D1 along the scan direction of the display unit 100, and the left-right image 1 is maintained in the remaining areas D2, D3, and D4. Here, the barrier driving signals CB11 and CB21 have the level of the liquid crystal driving voltage V1, and the liquid crystal driving voltage V1 is applied to the first connection electrode 403 and the second connection electrode 405. Thereby, the image of the 1/4 area D1 of the display unit 100 is interrupted. In addition, the barrier driving signals CB12, CB13, and CB14 have the level of the liquid crystal driving voltage V1, and the barrier driving signals CB22, CB23, and CB24 have the level of the common voltage Vcom. The left-right image 1 is displayed as a stereoscopic image in the remaining areas D2, D3, and D4 of the display unit 100.

During the period T22 that is a second quarter of a time period where the left-right image 1 is changed to the right-left image 2, the right-left image 2 is displayed in the 1/4 and 2/4 areas D1 and D2 along the scan direction in the display unit 100, and the left-right image 1 remains in the 3/4 and 4/4 areas D3 and D4. Here, the barrier driving signals CB12 and CB22 have the level of the liquid crystal driving voltage V1, and the liquid crystal driving voltage V1 is applied to the third connection electrode 421 and the fourth connection electrode 422. Thereby, the image of the 2/4 area D2 of the display unit 100 is interrupted. In addition, the barrier driving signals CB21, CB13, and CB14 have the level of the liquid crystal driving voltage V1, and the barrier driving signals CB11, CB23, and CB24 have the level of the common voltage Vcom. The right-left image 2 is displayed as a stereoscopic image in the 1/4 area D1 of the display unit 100, and the left-right image 1 is displayed as a stereoscopic image in the 3/4 and 4/4 areas D3 and D4.

During the period T23 which is a third quarter of a time period where the left-right image 1 is changed to the right-left image 2, the right-left image 2 is displayed in the 1/4, 2/4, and 3/4 areas D1, D2, and D3 along the scan direction in the display unit 100, and the left-right image 1 remains in the 4/4 area D4. Here, the barrier driving signals CB13 and CB23 have the level of the liquid crystal driving voltage V1, and the liquid crystal driving voltage V1 is applied to the fifth connection electrode 407 and the sixth connection electrode 408. Thereby, the image of the 3/4 area D3 of the display unit 100 is interrupted. In addition, the barrier driving signals CB21, CB22, and CB14 have the level of the liquid crystal driving voltage V1, and the barrier driving signals CB11, CB12, and CB24 have the level of the common voltage Vcom. The right-left image 2 is displayed as a stereoscopic image in the 1/4 and 2/4 areas D1 and D2 of the display unit 100, and the left-right image 1 is displayed as a stereoscopic image in the 4/4 area D4.

During the period T24 which is a fourth quarter of a time period where the left-right image 1 is changed to the right-left image 2, the right-left image 2 is displayed in the areas D1, D2, D3, and D4 along the scan direction of the display unit 100. Here, the barrier driving signals CB14 and CB24 have the level of the liquid crystal driving voltage V1, and the liquid crystal driving voltage V1 is applied to the seventh connection electrode 423 and the eighth connection electrode 424. Thereby, the image of the 4/4 area D4 of the display unit 100 is interrupted. In addition, the barrier driving signals CB21, CB22, and CB23 have the levels of the liquid crystal driving voltage V1, and the barrier driving signals CB11, CB12, and CB13 have the level of the common voltage Vcom. The right-left image 2 is displayed as a stereoscopic image in the 1/4 to 3/4 areas D1, D2, and D3 of the display unit 100.

During the period T25 which is a sustain period, the right-left image 2 is maintained for a predetermined time after the right-left image 2 is displayed in the areas D1, D2, D3, and D4 of the display unit 100. The barrier driving signals CB21 to CB24 have the level of the liquid crystal driving voltage V1, and the barrier driving signals CB11 and CB14 have the level of the common voltage Vcom. Thereby, the right-left image 2 is displayed as a stereoscopic image in the areas D1, D2, D3, and D4 of the display unit 100.

As described above, when the scan direction of the display unit 100 is the same as the length direction of the first to fourth sub-electrodes 401, 402, 427, and 428, and the barrier unit 400 is divided into the plurality of areas R1, R2, R3, and R4, boundary parts therebetween are not seen.

That is, the connection electrodes 403, 405, 407, and 408 connected to the first electrode group 40 are located in an area that is different from that of the first electrode group 40, the connection electrodes 421, 422, 423, and 424 connected to the second electrode group 42 are located in an area that is different from that of the second electrode group 42, the first sub-electrode 401 and the third sub-electrode 427 neighbor each other along the scan direction of the display unit 100, and the second sub-electrode 402 and the fourth sub-electrode 428 neighbor each other along the scan direction of the display unit 100.

Figure 15:
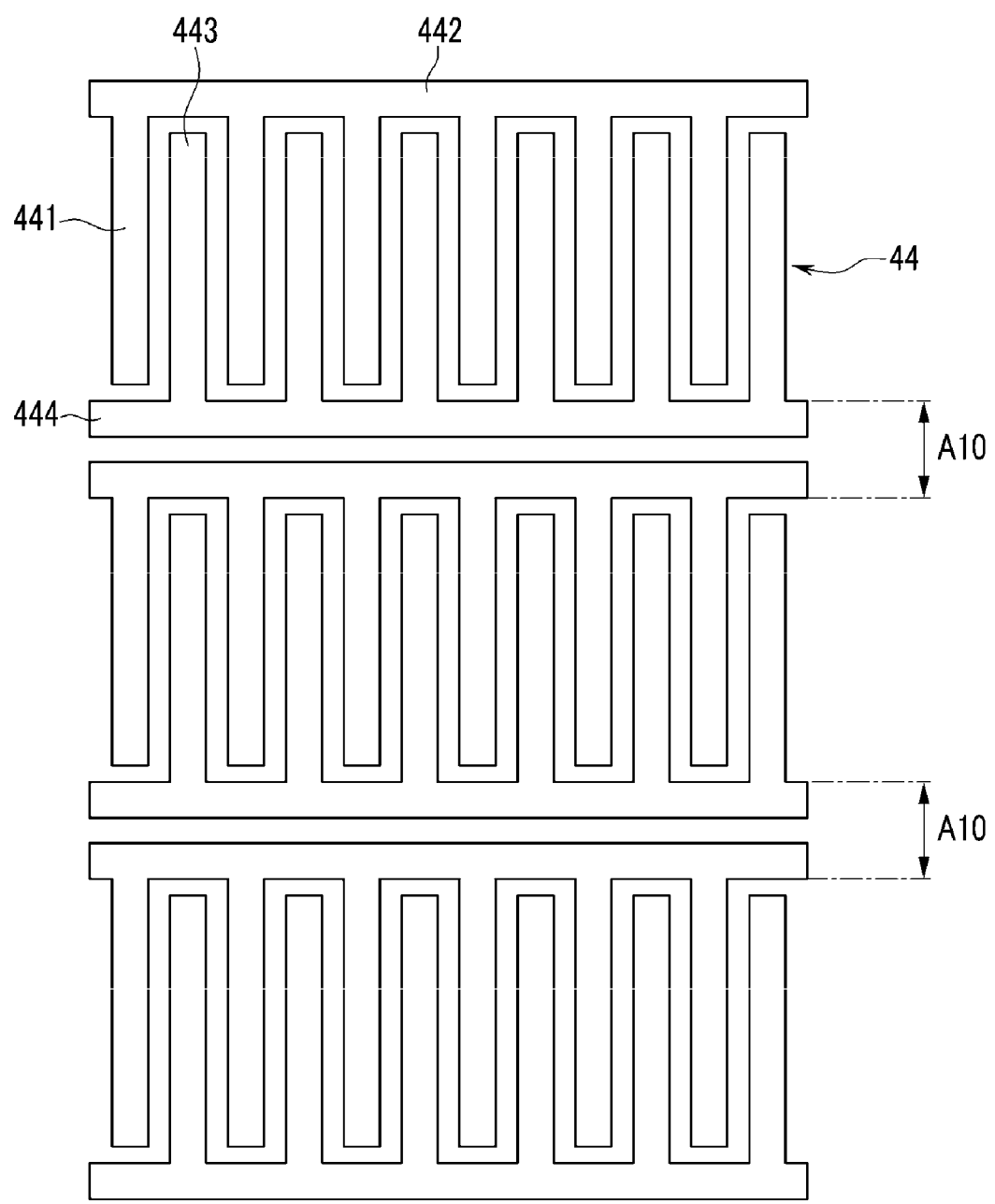
FIG. 15 is a top plan view of a barrier unit of a comparative example.

FIG. 15 is a top plan view of a barrier unit of a comparative example. As shown in FIG. 15, in the barrier unit of the comparative example, an electrode group 44 including a plurality of first sub-electrodes 441, a first connection electrode 442, a plurality of second sub-electrodes 443, and a second connection electrode 444 are repeatedly arranged along the scan direction of the display unit. In this configuration, a left-right image and a right-left image may not be separated in an area A10 where the first connection electrode 442 and the second connection electrode 444 are provided. Accordingly, when the electronic display device is driven, since the area A10 where the first connection electrode 442 and the second connection electrode 444 are provided is seen as a black or white line in the screen, image quality of the stereoscopic image is deteriorated.

In addition, since the electronic display device 10 according to aspects of the present invention is driven in a time-division method to display a stereoscopic image of a resolution that is the same as a plane image, and since an area where the left-right image and the right-left image are displayed together is interrupted by using the barrier unit 400, crosstalk may be prevented. Further, the electronic display device 10 according to aspects of the present invention has a reduced driving frequency and power consumption in comparison with the conventional electronic display device 10.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An electronic display device, comprising:
a display unit comprising a plurality of scan lines, a plurality of data lines, and plurality of pixels crossing the scan and data lines; and
a barrier unit covering the display unit, the barrier unit comprising:
a plurality of first areas and a plurality of second areas alternately arranged along a first direction,
first electrode groups respectively provided in each of the first areas, each of the first electrode groups comprising a plurality of first sub-electrodes and a plurality of second sub-electrodes alternately arranged along a second direction, the second direction intersecting the first direction,
second electrode groups respectively provided in each of the second areas on a layer that is above a layer on which the first electrode group is provided, each of the second electrode groups comprising a plurality of third sub-electrodes and a plurality of fourth sub-electrodes alternately arranged along the second direction, and
an insulation layer above the first electrode group, the second electrode group being above the insulation layer, wherein:
each of the first sub-electrodes neighbors a corresponding one of the third sub-electrodes without a gap therebetween along the first direction when viewed from a plane above the second electrode group, the plane being parallel to a plane defined by the first and second directions, and
each of the second sub-electrodes neighbors a corresponding one of the fourth sub-electrodes without a gap therebetween along the first direction when viewed from the plane above the second electrode group.

2. The electronic display device of claim 1, wherein:
each of the first sub-electrodes, the second sub-electrodes, the third sub-electrodes, and the fourth sub-electrodes have a slit shape that is parallel to the first direction,
lateral ends of the first sub-electrodes neighbor lateral ends of the third sub-electrodes without the gap therebetween along the first direction, and
lateral ends of the second sub-electrodes neighbor lateral ends of the second sub-electrodes neighbors lateral ends of the fourth sub-electrodes without the gap therebetween along the first direction.

3. The electronic display device of claim 1, further comprising first connection electrodes and first connecting portions that are connected to the first electrode groups, wherein:
   each of the first sub-electrodes of each of the first electrode groups includes a first end and a second end along the first direction,
   the first connection electrodes are provided in the second areas and the second electrode groups overlap the first connection electrodes, respectively, with the insulation layer therebetween,
   the first connection electrodes face the first ends of the first sub-electrodes, the first connection electrodes being arranged along the first direction, and
   the first connecting portions are between each of the first ends of the first sub-electrodes and the first connection electrodes to electrically connect the first sub-electrodes and the first connection electrodes.

4. The electronic display device of claim 3, further comprising second connection electrodes and second connecting portions that are connected to the first electrode groups, wherein:
   each of the second sub-electrodes of each of the first electrode groups includes a first end a second end along the first direction,
   the second connection electrodes are provided in the second areas and the second electrode groups overlap the second connection electrodes, respectively, with the insulation layer therebetween,
   the second connection electrodes face the second ends of the second sub-electrodes, the second connection electrodes being arranged along the first direction, and
   the second connecting portions are between-each of the second ends of the second sub-electrodes and the second connection electrodes to electrically connect the second sub-electrodes and the second connection electrodes.

5. The electronic display device of claim 4, wherein one of the third sub-electrodes and a corresponding one of the fourth sub-electrodes overlap with at least one of the connection electrodes among the first and second connection electrodes.

6. The electronic display device of claim 1, further comprising third connection electrodes and fourth connection electrodes on the layer on which the first electrode group is provided so that the insulation layer is between the third and fourth connection electrodes and the second electrode groups, wherein:
   each third connection electrode is respectively electrically connected to the second electrode groups, the third connection electrode being electrically connected to each of the third sub-electrodes through first openings extending through the insulation layer, and
   each fourth connection electrode is respectively electrically connected to the second electrode groups, the fourth connection electrode being electrically connected to each of the fourth sub-electrodes through second openings extending through the insulation layer.

7. The electronic display device of claim 6, wherein the first electrode groups, the third connection electrode, and the fourth connection electrode are provided under the insulation layer and farther from a screen of the display unit, and each of the second electrode groups are provided above the insulation layer and closer to the screen.

8. The electrode display device of claim 7, wherein:
   the first openings are in respective second areas between the third connection electrode and the third sub-electrodes; and
   the second openings are in respective second areas between the fourth connection electrode and the fourth sub-electrodes.

9. An electronic display device, comprising:
   a display unit comprising a plurality of scan lines to transmit a plurality of selection signals, a plurality of data lines to transmit a plurality of data signals respectively corresponding to a first image and a second image formed according to an input signal, and a plurality of pixels connected to the scan lines and the data lines; and
   a barrier unit covering the display unit, the barrier unit comprising:
      a first area and a second area arranged adjacent to each other along a first direction,
      a plurality of first sub-electrodes provided in the first area and driven in synchronization with a corresponding first selection signal among the plurality of selection signals during a first period to display the first image,
      a plurality of second sub-electrodes provided in the first area and driven in synchronization with a corresponding second selection signal among the plurality of selection signals during a second period to display the second image, the first sub-electrodes and the second sub-electrodes being alternately arranged along a second direction in the first area, and the second direction intersecting the first direction,
      a plurality of third sub-electrodes provided in the second area and driven in synchronization with a corresponding third selection signal among the plurality of selection signals during the first period,
      a plurality of fourth sub-electrodes provided in the second area and driven in synchronization with a corresponding fourth selection signal among the plurality of selection signals during the second period, the third sub-electrodes and the fourth sub-electrodes being alternately arranged along the second direction in the second area, and the third and fourth sub-electrodes being provided on a layer that is above a layer on which the first and second sub-electrodes are provided, and
      an insulation layer above the first and second sub-electrodes, the third and fourth sub-electrodes being above the insulation layer, wherein:
         each of the first sub-electrodes neighbors a correspond one of the third sub-electrodes without a gap therebetween along the first direction when viewed from a plane above the third and fourth sub-electrodes, the plane being parallel to a plane defined by the first and second directions, and
         each of the second sub-electrodes neighbors a corresponding one of the fourth sub-electrodes without a gap therebetween along the first direction when viewed from the plane above the third and fourth sub-electrodes.

10. The electronic display device of claim 9, wherein a portion of the barrier unit covering the first areas functions as an opaque area when the first and second images are displayed in the first area.

11. The electronic display device of claim 9, wherein a portion of the barrier unit covering the second area functions as an opaque area when the first and second images are displayed in the second area.

12. The electronic display device of claim 9, wherein the input signal has at least a first viewing point image and a second viewing point image, the first image is generated by combining the first viewing point image and the second viewing point image in an order beginning with the first viewing point image and progressing to the second viewing point image over time, and the second image is generated by combining the first viewing point image and the second viewing point image in an order beginning with the second viewing point image and progressing to the first viewing point image over time.

13. The electronic display device of claim 9, wherein, during the first period, a voltage of a first voltage level is applied to the plurality of first sub-electrodes and the plurality of third sub-electrodes, and a voltage of a second voltage level is applied to the plurality of second sub-electrodes and the plurality of fourth sub-electrodes.

14. The electronic display device of claim 13, wherein the barrier unit comprises first and second substrates facing each other while having a liquid crystal layer therebetween and a common electrode formed on an inner surface of the first substrate, and the plurality of first sub-electrodes, the plurality of second sub-electrodes, the plurality of third sub-electrodes, and the plurality of fourth sub-electrodes are provided between an inner surface of the second substrate and the liquid crystal layer.

15. The electronic display device of claim 14, wherein the voltage of the second voltage level is the same as a voltage of the common electrode.

16. The electronic display device of claim 9, wherein, during the second period, a voltage of a first voltage level is applied to the plurality of first sub-electrodes and the plurality of third sub-electrodes, and a voltage of a second voltage level is applied to the plurality of second sub-electrodes and the plurality of fourth sub-electrodes.

17. The electronic display device of claim 16, wherein the barrier unit comprises first and second substrates facing each other while having a liquid crystal layer therebetween and a common electrode formed on an inner surface of the first substrate, and the plurality of first sub-electrodes, the plurality of second sub-electrodes, the plurality of third sub-electrodes, and the plurality of fourth sub-electrodes are provided between an inner surface of the second substrate and the liquid crystal layer.

18. The electronic display device of claim 17, wherein the voltage of the first voltage level is the same as a voltage of the common electrode.

19. The electronic display device of claim 9, wherein the input signal comprises one of 3D graphics data including three-dimensional space coordinates and surface information of an object to stereoscopically display an image on a plane surface, and stereoscopic image data including viewing point image data.

\* \* \* \* \*